March 12, 1968 J. SCHNELL 3,372,737

UNIDIRECTIONAL HEAT TRANSMITTER

Filed Sept. 27, 1965 3 Sheets-Sheet 1

INVENTOR.
JOACHIM SCHNELL
BY
[signature]
AGENT

INVENTOR.
JOACHIM SCHNELL
BY
Frank R. Jinfani
AGENT

INVENTOR.
JOACHIM SCHNELL
BY
Frank R. Jeffries
AGENT

United States Patent Office 3,372,737

Patented Mar. 12, 1968

3,372,737

UNIDIRECTIONAL HEAT TRANSMITTER

Joachim Schnell, Haaren, Germany, assignor to North American Philips Company, Inc., New York, N.Y., a corporation of Delaware Filed Sept. 27, 1965, Ser. No. 490,499
Claims priority, application Germany, Oct. 7, 1964, P 35,236
13 Claims. (Cl. 165—32)

ABSTRACT OF THE DISCLOSURE

Apparatus for transferring heat between two external surfaces in one direction only. An external surface of a first member is connected to a body having a high heat conductivity and a body having a high coefficient of expansion. An external surface of a second member is similarly connected. Each of the members have confronting internal surfaces. The coefficients of expansion and the positioning of the members are related so that heat is transmitted from the first external surface to the second external surface only.

The invention relates to a heat valve, that is to say, a heat transmitting member which transmits heat between two outer surfaces in one direction only. The heat flows from one to the other outer surface consequently depends, as is usual, upon the temperature difference between the said surfaces.

The desirability of having such a heat valve occurs in particular in the operation of cooling devices operating according to the Peltier-effect. When a Peltier device is switched off, a considerable return heat flow, from the warm side, of the battery to the cold side occurs as a result of the heat conductivity of the semiconductor material used for the Peltier elements. To avoid the said return heat flow, the thermal contact between the cold side of the battery and the heat exchanger (cooling fins, etc.) connected to it must be interrupted after switching off the battery, that is, it must be ensured that heat can flow from the heat exchanger to the Peltier battery but not in the reverse direction. To solve this problem it is known to interrupt contact between the heat exchanger and the cooling device by removing a liquid which normally serves as a carrier for heat. Further, it is known to use a secondary cooling circuit with Freon as the transporting means which circuit is interrupted after the cooling device is turned off.

All the known solutions suffer from complexity and require a particular liquid circuit.

It is the object of the invention to avoid the complexity of the known solutions and to provide a particularly simple, reliable and economic heat valve which provides heat transmission between two elements in one direction only.

Figure 1:
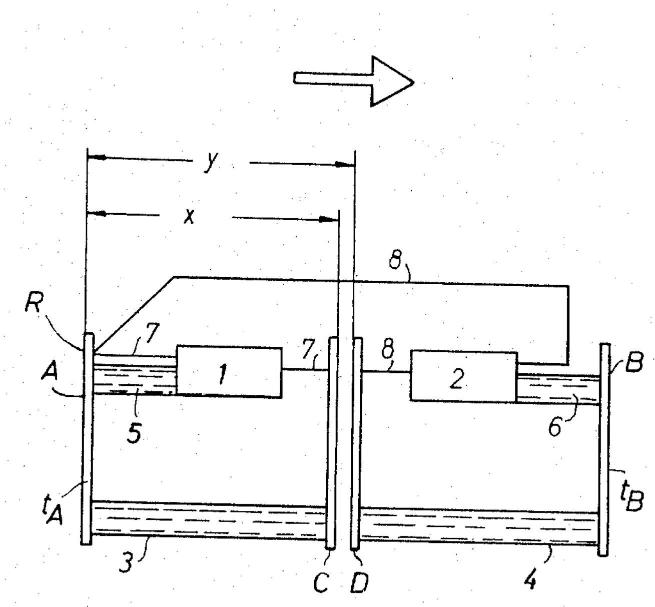

In order that the invention may readily be carried into effect a few embodiments thereof will now be described in greater detail, by way of example, with reference to the accompanying drawings, in which FIG. 1 diagrammatically illustrates the principle of operation of the heat transmitting member according to the invention, and FIGS. 2 to 6 show different practical embodiments of the heat transmitting member diagrammatically shown in FIG. 1.

FIG. 1 diagrammatically shows the principle of the heat valve or heat transmitting member according to the invention. The heat transmitting member comprises two outer members A and B between which heat is to be transmitted in one direction only as indicated by the arrow and two oppositely located inner members C and D. The inner member C is in heat-conducting relationship with the outer member A through a suitable connection 3 and the inner member D is in heat-conducting relationship with the outer member B through a suitable connection 4. The inner members C and D may also each consist of several oppositely located elements. The first inner member C is connected to a reference point R by means of suitable connecting means 7, including a thermomechanical member 1, so that the distance $x$ of the surface C from the reference point R depends upon the temperature of the thermomechanical member 1 which is in a heat-conducting relationship with the outer member A through a suitable connection 5. Consequently, the distance $x$ depends upon the temperature $t_A$ of the first outer member A.

The second inner member D located opposite the first inner member C is connected to the said reference point R by means of suitable connection 8 coupled with a thermomechanical member 2 so that the distance $y$ of the member D from the reference joint R depends upon the temperature of the thermomechanical member 2 which is in heat-conducting relationship with the second outer member B through a suitable connection 6. The distance $y$ of the second inner member D from the reference point R consequently depends upon the temperature $t_B$ of the second outer member B.

To ensure that heat transmission through the whole member (from A to B) is possible only in the direction of the arrow, the direction of expansion of the thermomechanical members 1 and 2 must be chosen such that both the distance $x$ and the distance $y$ increase when both the temperatures $t_A$ and $t_B$ increase. The location of the reference point R may be chosen arbitrarily. It is possible, for example, as shown in FIG. 1, that the reference point R is located at the outer surface of A.

It is now theoretically possible when:

(1) $$t_A > t_B \quad y < x$$

This means that the gap between members C and D is closed so that heat is transmitted through the whole member when the temperature of the outer surface A is higher than the temperature of the outer surface B.

(2) $$t_A < t_B \quad y > x$$

This means that between the inner members C and D a gap exists so that no heat is transmitted through the whole member when the temperature of the outer member B is higher than the temperature of the outer member A.

(3) $$t_A = t_B \quad y = x$$

This means that when the temperature of the two outer surfaces are equal, the gap just begins to open and close respectivelq Assuming that $x = x_0(1 \pm \alpha t_A)$ and $y = c + y_0(1 \pm \beta t_B)$, where $x_0$, $y_0$, $\alpha$, $\beta$ and $c$ are an approximation to be considered as constants of the thermomechanical members 1 and 2; that is $x_0$ and $y_0$ are values at 0° centigrate, $\alpha$ and $\beta$ are the coefficients of expansion of the respective members 1 and 2, and $c$ is a predetermined constant. For any desired temperature $t_A = t_B$ the condition at which $x = y$ may easily be derived.

Assuming: $$\pm x_0 \alpha = \pm y_0 \beta$$

Then: $$x_0 = y_0 + c$$

For the heat transmitting members 3, 4, 5 and 6 any medium may be chosen but preferably solids or liquids are used. The thermomechanical members 1 and 2 also may have any construction and may transfer their variation in length to the variation in volume of a solid, a liquid or a gas and to the phase variation (liquid-gaseous or solid-gaseous) of a solid or a liquid respectively. Naturally, every thermomechanical member 1 and 2 may consist of several parallel and/or series-arranged individual thermomechanical members the variations in length of which are based upon equal or different thermomechanical effects.

Alternatively it is possible to omit the thermomechanical member 2 and in this manner considerably simplify the heat transmitting member. In this case, $y=c$ const. Consequently, however, $x=y$ holds good only for a particular temperature $t_A=t_B$.

A particularly simple construction of the heat transmitting members is obtained when the heat-conducting connections 3, 4 betwen the members A and C and B and D respectively are formed by the corresponding thermomechanical members 1 and 2.

Figure 2:
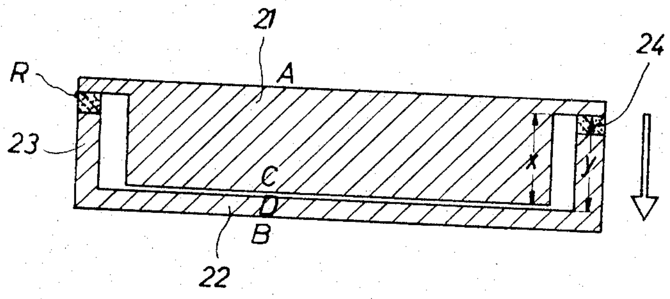

FIG. 2 shows a first embodiment of a heat transmitting member according to the invention. The heat transmitting member which transmits heat in the direction of the arrow only, consists of two thermomechanical parts 21 and 22 of a material having a suitable high coefficient of expansion and which are separated from one another by a non-heat-conducting part 24 which also preferably has a very low coefficient of expansion. As long as the temperature $t_A$ of the outer surface A of part 21 exceds the temperature $t_B$ of the outer surface B of part 22 the the expansion of the part 21 at right angles to the outer surface A is greater than the expansion of the edge or wall 23 of the part 22 at right angles to the outer surface, B, so that $y>x$ and consequently the inner surface C and D are forced against one another. As soon as the temperature of the outer surface B exceeds that of the outer surface A the ratio of expansion inverts, that is to say, $y$ is larger than $x$ and between the inner surfaces C and D a gap is formed which interrupts the transmission of heat from 21 to 22.

So in this embodiment the heat-conducting connection between the outer surface A and the inner surface C is formed by the thermomechanical member 21 which varies the distance between the surfaces A and C, or varies distance $x$ measured from R, while the thermomechanical member 22 between the surfaces B and D is formed by the edge portion 23 (which varies distance $y$ measured from R) operating as a heat conducting connection with its central portion.

Figure 3:
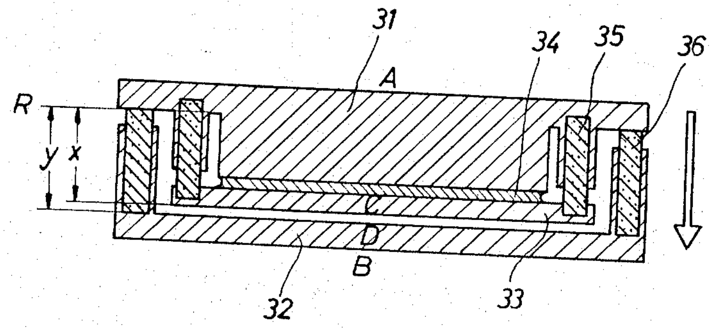

FIG. 3 shows another embodiment in which the thermomechanical members operative between the reference point R and the surfaces C and D respectively are formed by thermomechanical parts 35 and 36 which have high coefficients of expansion and which are in heat-conducting relationship with the outer surface A of member 31 and the outer surface B of member 32 respectively. The parts 31 and 32 consist of a readily heat-conducting material but having the lowest possible coefficient of expansion. The thermomechanical member 35 moves an intermediate part 33 which is a good conductor but has a low coefficient of expansion which comprises the inner surface C which part is in heat-conducting relationship with the part 31 through a flexible medium 34, for example, a liquid, such as mercury, or flexible metal tapes. The operation corresponds to that of the heat transmitting member shown in FIG. 2 with the exception that the parts 31, 32 and 33 do not expand. However, parts 32 and 33, depending on expansion of the thermomechanical parts 35 and 36 do vary position relative to part 31 and one another.

Figure 4:
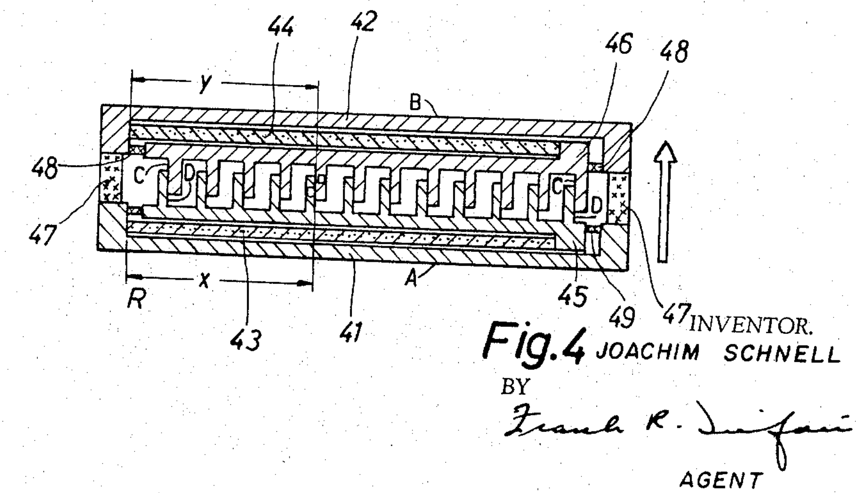

FIG. 4 shows an embodiment in which the inner surfaces C and D are divided into a plurality of separate surfaces which extend at right angles to the outer surfaces A and B. The thermomechanical rods 43 and 44 consist of a material with a high coefficient of expansion which, in accordance with the temperature of the outer surfaces A and B respectively, vary the mutual position of the parts 45 and 46 in which the inner surfaces C and D are respectively located. The rods 43 and 44 have a common reference point R which is formed by the side faces of the housing parts consisting of the members 41 and 42. The two members 41 and 42 of the housing, the outer surfaces of which constitute the outer surfaces A and B of the heat transmitting member, are held in spaced apart relation by elements 47 consisting of a non-heat-conducting material with a low or negligible coefficient of expansion. The heat-conducting connection between the outer surfaces A and B and the thermomechanical rods 43 and 44, as well as the inner surfaces C and D is formed by two separate quantities of a readily heat-conducting liquid which are contained in the two separate spaces of the inner space of the transmitting members 41 and 42 which are separated from one another by the partitions 48 and 49. These partitions are flexible so as to adjust to the displacements of the parts 45 and 46 with respect to the parts 41 and 42.

The operation of this embodiment is as follows: As long as the temperature $t_A$ of the outer surface A exceeds that of the outer surface B, the expansion of the rod 43 and consequently the distance $x$, between a surface C and the reference point R, is larger than distance $y$, proportional to the length of the rod 44. Consequently, the distance $x$ between surface C and the reference point R is larger than the distance $y$, thus the surfaces C and D of parts 45 and 46 abut against one another. As soon as the temperature of the outer surface A is lower than that of the outer surface B, the longitudinal expansions of the rods 43 and 44 is reversed and consequently a gap is formed between the surfaces C and D. As a result of the division of the inner surfaces C and D the area of these inner surfaces is considerably increased.

Figure 5:
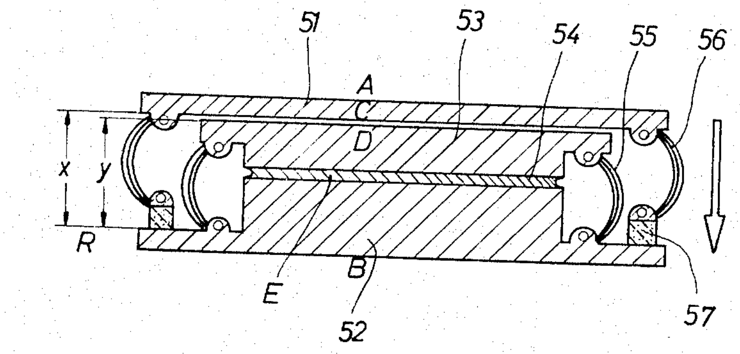

FIG. 5 shows an embodiment which substantially corresponds to the embodiment shown in FIG. 3. In the embodiment of FIG. 3, the members 35 and 36 expand more strongly when the temperature increases. In FIG. 5 these elements are replaced by bimetallic members 55 and 56, the length of which decreases when the temperature increases. As a result of the shortening instead of the elongation of the thermomechanical members 55, 56 when the temperature increases, a corresponding inverse construction is obtained, that is to say, the flexible heat transmission medium 54 is arranged between the part 52 comprising the outer surface B and the part 53 comprising the inner surface D. The part 51 comprises the outer surface A and the inner surface C. The said three parts 51, 52, 53 consist of good heat-conducting material with the lowest possible coefficient of expansion. The bimetallic thermomechanical member 56 engages the part 52 via a separator 57 of a poor heat-conducting, low expansion material.

The operation corresponds to that of the heat transmitting member shown in FIG. 3, but in reverse, that is to say, as long as the temperature $t_A$ exceeds the temperature $t_B$, or, as long as $y>x$ the length of the bimetallic member 56 decreases in height a greater amount than the bimetallic element 55; hence the gap between the surfaces C and D is closed. As soon as the temperature $t_B$ exceeds the temperature $t_A$, the gap between C and D is opened since bimetallic element 55 will decrease in height a greater amount than bimetallic element 56.

Figure 6:
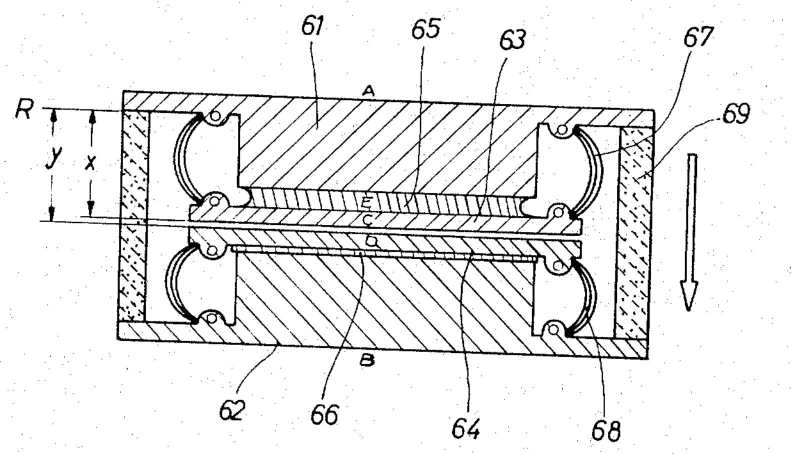

FIG. 6 shows a further embodiment with bimetallic members 67 and 68 as thermomechanical members. The parts 61, 62, 63 and 64 consist of good heat-conducting material with a low coefficient of expansion. The bimetallic members 67 elongate when the temperature increases, whereas the bimetallic members 68 shorten when the temperature increases. So in this case also the distance $x$ between the reference point and the inner surface C exceeds the distance $y$ between the reference point and the inner surface D as long as the temperature $t_A$ exceeds the temperature $t_B$, that is to say, the gap is closed.

The heat-conducting connection 65, 66 between the parts 61 and 63 and 62 and 64 respectively in this case also, as in the embodiments shown in the FIGS. 3 and 5, consists of a suitable liquid for example, mercury or flexible metal tapes or the like.

To improve the contact and consequently the heat transmission between the inner surfaces C and D, one of these surfaces may be coated with a layer of a soft good heat-conducting material, for example, a solder or a similar soft metal alloy which readily adheres to the surfaces. Also it has proven to be of particular advantage to provide a liquid, preferably a film of silicon oil, on one or both of the surfaces.

What is claimed is:

1. Apparatus comprising means for unidirectional heat transmission between a first outer surface and a second outer surface of said means, said means including a first system for conducting heat to a first inner surface from said first outer surface, and a second system for conducting heat from a second inner surface to said second outer surface, said first and second inner surfaces being in opposing relation, said first system including thermomechanical means for varying the distance between a selected reference point and said first inner surface according to the relationship $x=x_0\ (1\pm\alpha t)$ where $x_0$ is said distance at zero degrees centigrade, $\alpha$ is the coefficient of expansion of said thermomechanical means, and $t$ is the temperature of said first surface; said distance $x$ being selected so that said first and second inner surfaces abut one another when the temperature $t$ exceeds a determined value and are separated when the temperature $t$ is less than said determined value whereby heat transmission from said second outer surface to said first outer surface is interrupted by the separation of said inner surfaces and wherein said second system includes a second thermomechanical means for varying a second distance $y$ between said selected reference point and said second inner surface according to the relationship $y_0=(1\pm\beta t')$ where $y_0$ is said second distance at zero degrees centigrade, $\beta$ is the coefficient of expansion of said second thermomechanical means and $t'$ is the temperature of said second outer surface; the distances between said reference point and said first and second inner surfaces and the values of $x_0$, $y_0$, $\alpha$, $\beta$, $t$ and $t'$ being selected so that said first and second inner surfaces just touch one another when $t$ and $t'$ are substantially equal and are forced against one another when $t>t'$ and are separated when $t<t'$.

2. Apparatus according to claim 1 wherein at least one of said first and second systems comprises a solid body of heat conducting material defining one of said inner and outer surfaces and having a coefficient of expansion equal to a respective one of said coefficient of expansions $\alpha$ and $\beta$.

3. Apparatus according to claim 2 wherein the other of said systems comprises a second generally cup-shaped body having said solid body nested therein, said second body having a relatively low coefficient of expansion compared with the coefficient of expansion of said solid body.

4. Apparatus according to claim 1 wherein at least one of said first and second systems comprises a configured body of good heat conducting material having a low coefficient of expansion said configured body defining one of said outer surfaces, an associated body of like material defining one of said first inner surface, said associated thermomechanical means supporting said configured and associated bodies in spaced relation, and an elastic heat conducting material in said space between said bodies.

5. Apparatus according to claim 4 wherein said heat conducting material is mercury.

6. Apparatus according to claim 1 wherein said distances depend on the volume variation of said thermomechanical means.

7. Apparatus according to claim 1 wherein said thermomechanical means comprises bimetallic strips.

8. Apparatus according to claim 1 wherein said thermomechanical means includes a container for immersing a thermomechanical member in a body of heat conducting liquid.

9. Apparatus according to claim 1 with the addition of compliant means for coating said opposed inner surfaces with a good heat conducting material.

10. Apparatus according to claim 9 wherein said compliant means comprises a solder material.

11. Apparatus according to claim 9 wherein said compliant means comprises a silicon oil.

12. Apparatus according to claim 1 wherein said first and second inner surfaces are defined by a pair of comb-like members having nested teeth, the teeth of said comb-like members in abutting relation transmitting heat between said inner surfaces and terminating said transmission when separated.

13. Apparatus according to claim 1 wherein said coefficient of expansion $\alpha$ and $\beta$ are unequal.

References Cited

UNITED STATES PATENTS

| | | | |
|---|---|---|---|
| 1,703,803 | 2/1929 | Widstrom | 165—96 X |
| 1,739,295 | 12/1929 | Diebold | 236—1 |
| 2,782,782 | 2/1957 | Taylor | 165—32 X |
| 2,949,283 | 8/1960 | Smith | 165—96 X |
| 3,112,878 | 12/1963 | Snelling | 165—32 X |
| 3,177,933 | 4/1965 | Webb | 165—96 |
| 3,183,121 | 5/1965 | Moeller | 165—185 X |
| 3,225,820 | 12/1965 | Riordan | 165—96 X |

FOREIGN PATENTS 1,138,129 10/1962 Germany.

ROBERT A. O'LEARY, *Primary Examiner.*

A. W. DAVIS, *Assistant Examiner.*